(12) United States Patent
Ling et al.

(10) Patent No.: US 10,039,124 B2
(45) Date of Patent: Jul. 31, 2018

(54) NEGOTIATED SCHEDULES FOR COEXISTENCE IN UNLICENSED FREQUENCY BANDS

(71) Applicant: Alcatel Lucent, Paris (FR)

(72) Inventors: Jonathan Ling, North Brunswick, NJ (US); David Lopez-Perez, Blanchardstown (IE); Mohammad Khawer, Lake Hopatcong, NJ (US)

(73) Assignee: Nokia Technologies Oy, Espoo (FI)

( * ) Notice: Subject to any disclaimer, the term of this patent is extended or adjusted under 35 U.S.C. 154(b) by 154 days.

(21) Appl. No.: 15/167,122

(22) Filed: May 27, 2016

(65) Prior Publication Data
US 2017/0347366 A1 Nov. 30, 2017

(51) Int. Cl.
*H04W 4/00* (2018.01)
*H04W 72/12* (2009.01)
*H04W 16/14* (2009.01)

(52) U.S. Cl.
CPC ....... *H04W 72/1215* (2013.01); *H04W 16/14* (2013.01)

(58) Field of Classification Search
CPC ........................ H04W 72/1215; H04W 16/14
USPC ........................................................ 370/329
See application file for complete search history.

(56) References Cited

U.S. PATENT DOCUMENTS

| 2015/0049709 | A1* | 2/2015 | Damnjanovic ....... H04L 5/0055 370/329 |
| 2016/0066204 | A1  | 3/2016 | Khawer et al. |
| 2016/0095110 | A1  | 3/2016 | Li et al. |
| 2016/0226637 | A1* | 8/2016 | Nory .................... H04L 5/0053 |
| 2017/0142592 | A1* | 5/2017 | Fischer ................ H04W 16/14 |

OTHER PUBLICATIONS

Samsung, "R1-151038, Evaluation results for LAA and WiFi coexistence", 3GPP TSG RAN WG1 Ad-hoc Meeting, Mar. 24, 2015, 7 pages.
International Search Report and Written Opinion correlating to PCT/EP2017/062515, dated Sep. 12, 2017, 9 pages.

* cited by examiner

*Primary Examiner* — Mang Yeung
(74) *Attorney, Agent, or Firm* — Davidson Sheehan LLP

(57) ABSTRACT

A first node that operates according to a first radio access technology (RAT) provides a first schedule to a second node that operates according to a second RAT. The first schedule requests a first portion of a subsequent time interval for transmission in an unlicensed frequency band. The first node receives one or more second schedules from a second node. The one or more second schedules request one or more second portions of the subsequent time interval for transmission in the unlicensed frequency band. The first node transmits signals in the unlicensed frequency bands during a third portion of the subsequent time interval that is determined based on the at least one second portion.

32 Claims, 8 Drawing Sheets

NEGOTIATED SCHEDULES FOR COEXISTENCE IN UNLICENSED FREQUENCY BANDS

BACKGROUND

Field of the Disclosure

The present disclosure relates generally to wireless communication systems and, more particularly, to communication in unlicensed frequency bands of wireless communication systems.

Description of the Related Art

Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider or license holder.

Wireless communication devices that transmit or receive signals in licensed or unlicensed frequency bands are typically referred to as nodes, which may include Wi-Fi access points that operate according to IEEE 802.11 standards in the unlicensed spectrum. Nodes may also include base stations that operate in the licensed spectrum according to standards such as Long Term Evolution (LTE) standards defined by the Third Generation Partnership Project (3GPP). Base stations that operate according to LTE can implement supplementary downlink (SDL) channels in the unlicensed spectrum to provide additional bandwidth for downlink communications to user equipment that are also communicating with the base station using channels in a licensed frequency band. The licensed frequency bands may be referred to as LTE-L bands and the unlicensed frequency bands may be referred to as LTE-U bands. Base stations may also operate in the unlicensed frequency bands according to Licensed Assisted Access (LAA) standards. Base stations may also operate solely in the unlicensed frequency bands without support in licensed frequency bands, e.g., according to emerging standards such as MuLTEFire.

In dense networks, channels in the unlicensed frequency bands may be reused by nodes that operate according to different radio access technologies (RATs) such as Wi-Fi access points and LTE base stations. Communication by the nodes that operate according to the different RATs is coordinated to reduce interference between transmissions by the different nodes. For example, listen before talk (LBT) coexistence rules require that each node monitors a channel (e.g., "listens") to detect energy on the channel prior to transmitting information on the channel. If the detected energy level is below a threshold level, the node is free to transmit on the channel for a predetermined time interval such as 4 milliseconds (ms) or 10 ms. If the detected energy level is above the threshold level, which indicates that another node is transmitting on the channel, the listening node is required to back off by a randomly determined time interval before making another attempt to acquire the channel. The energy detection threshold for Wi-Fi is −62 dBm, the energy detection threshold for LTE-U is −72 dBm, and the energy detection threshold for LAA and MuLTEFire is −72 dBm. Wi-Fi nodes may also perform Wi-Fi preamble decoding on signals with detected energy levels below the energy detection threshold with sensitivity of at least −82 dBm. The Wi-Fi node backs off if it successfully decodes preambles in transmissions by other Wi-Fi nodes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
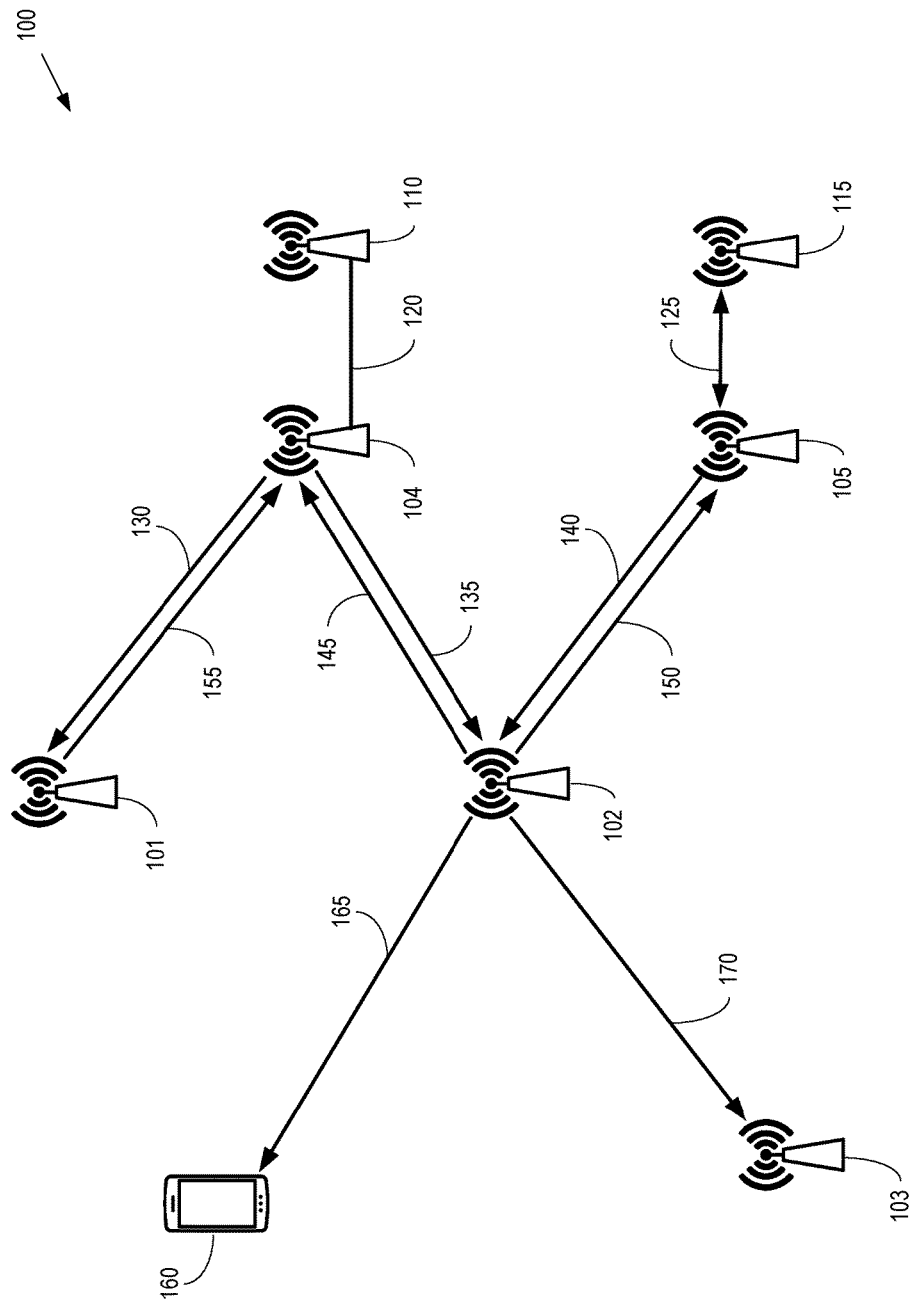
FIG. 1 is a diagram of a wireless communication system according to some embodiments.

Nodes that operate according to one radio access technology (RAT) may not be able to decode signals transmitted in the unlicensed frequency band according to a different RAT. For example, signals transmitted according to LTE-U or LAA in the unlicensed frequency band do not use the same frame structure as signals transmitted according to Wi-Fi. The Wi-Fi node is therefore not able to identify interfering LTE-U or LAA transmissions at energy levels below −62 dBm and does not back off in the presence of such transmissions. Similarly, nodes that operate according to LTE-U or LAA are not able to identify Wi-Fi transmissions at energy levels below −72 dBm. The LTE-U and LAA nodes therefore do not back off in the presence of such transmissions. Consequently, transmissions by Wi-Fi nodes, LTE-U nodes, and LAA nodes on channels of the unlicensed frequency bands are likely to interfere with transmissions by other nodes that operate according to different RATs on the same channels at energy levels between −62 dBm and −82 dBm. This interference increases error rates at the receiving nodes, which causes the node to reduce its transmission rate and its throughput.

Coexistence of nodes that operate according to different RATs can be enhanced if each (first) node that operates according to a first RAT generates a first schedule during a first time interval that indicates a request to transmit during a fraction of a subsequent, second time interval and then transmits the first schedule to a corresponding "friendly" node that operates according to a second RAT. As used herein, the term "subsequent" refers to a time interval that follows a "current" time interval in temporal order. Thus, a subsequent time interval may be the next time interval or a time interval that occurs after the next time interval. The first nodes may generate the first schedule based on load information such as transmission queue occupancies, throughput history, and the like. The first node has a wired or wireless interface with the corresponding friendly node and may be synchronized with the corresponding friendly node. For example, each first node may be co-located with a corresponding friendly node or may communicate with the friendly node over an air interface. The friendly node broadcasts the first schedule in a format determined according to the second RAT. Other (second) nodes that operate according to the second RAT may receive one or more broadcasts from one or more friendly nodes including the first schedules generated by one or more first nodes and merge the first schedules to determine a total fraction of the subsequent time interval that has been requested for communication according to the first RAT. The second node generates second schedules based on the received first schedules and loading information such as queue occupancies, throughput history, and the like. The second schedules are broadcast by the second nodes and received by the first nodes from their corresponding friendly nodes. Each of the first nodes may generate a third schedule by combining one or more second schedules received from one or more second nodes. The first nodes may then transmit information in a fraction of the subsequent time interval indicated by the third schedule.

FIG. 1 is a diagram of a wireless communication system 100 according to some embodiments. The wireless communication system 100 includes a first set of nodes 101, 102, 103 (collectively referred to herein as "the nodes 101-103") that provide wireless connectivity using channels of an unlicensed frequency band according to a first radio access technology (RAT). Some embodiments of the nodes 101-103 operate according to Wi-Fi standards. For example, the nodes 101-103 may be Wi-Fi access points that operate according to IEEE Std 802.11ac™-2013 or IEEE Std 802.11n™-2009, which are incorporated herein by reference in their entirety. A second set of nodes 104, 105 also provides wireless connectivity according to the first RAT. The second set of nodes 104, 105 is distinguished from the nodes 101-103 because the nodes 104, 105 are co-located with, or interconnected by an interface to, other nodes 110, 115 that operate according to a second RAT that is different than the first RAT. The nodes 104, 105 may therefore be referred to as "friendly" nodes.

Some embodiments of the nodes 110, 115 provide wireless connectivity in the unlicensed frequency band according to license assisted access (LAA) standards. For example, the nodes 110, 115 may operate according to standards such as the 3GPP TR 36.889 V13.0.0 (2015-06)-Study on Licensed Assisted Access to Unlicensed Spectrum (Release 13), which is incorporated herein by reference in its entirety. Some embodiments of the nodes 110, 115 provide wireless connectivity in the unlicensed frequency band according to Long Term Evolution (LTE) standards. For example, the nodes 110, 115 may operate according to the LTE-U SDL Coexistence Specifications v1.3 (2015), which is incorporated herein by reference in its entirety. The nodes 110, 115 may be interconnected with the friendly nodes 104, 105 by wired or wireless interfaces, which may be direct interfaces or indirect interfaces that include one or more intervening entities. For example, the node 110 is interconnected with the friendly node 104 by a wired interface 120 that operates according to Internet Protocol (IP) standards. For another example, the node 115 is interconnected with the friendly node 105 by a wireless interface 125 that provides control or scheduling information for one unlicensed frequency band (e.g., 5 GHz) using beacon signals transmitted in another unlicensed frequency band (e.g., 2 GHz).

Some embodiments of the nodes 110, 115 may be synchronized and have the same timeslot boundaries. The nodes 110, 115 may also be configured to schedule a common timeframe that is used to determine subsequent time intervals for transmission by the nodes 110, 115. For example, the common timeslot boundaries may be used to define a current time interval during which the nodes 110, 115 generate a schedule and a subsequent time interval (i.e., at a later time than the current time interval) during which the nodes 110, 115 transmit information according to a negotiated schedule, as discussed herein. Moreover, the subsequent time intervals scheduled by the nodes 110, 115 may be divided into the same number of subintervals that have the same duration. The nodes 110, 115 may also be running the same scheduling algorithm to determine schedules in the subsequent time intervals.

As discussed herein, the nodes 101-103 and the nodes 110, 115 may not be able to detect interfering transmissions at received signal strength levels below their corresponding energy detection thresholds because the nodes 101-103 and the nodes 110, 115 operate according to different RATs. Coexistence on channels of the unlicensed frequency band between the nodes 101-103 and the nodes 110, 115 may therefore be enhanced by leveraging the ability of the friendly nodes 104, 105 to communicate with the nodes 101-103 using their shared RAT. The nodes 101-103 and the nodes 110, 115 may therefore implement a handshaking protocol using the friendly nodes 104, 105 as intermediaries. For example, the node 110 can generate a schedule that requests access to a channel (or channels) of an unlicensed frequency band during a duty cycle or a set of subintervals of a subsequent time interval. The schedule may be determined based on loading information such as a queue occupancy or throughput history. The node 110 provides the schedule to the friendly node 104 over the interface 120 and the friendly node 104 transmits the schedule over the air interface to neighboring nodes 101, 102, as indicated by the arrows 130, 135. The friendly node 105 also transmits a schedule generated by the node 115 to the node 102, as indicated by the arrow 140.

The nodes 101, 102 use the schedules provided by the friendly nodes 104, 105 to determine how much of the subsequent time interval has been requested for transmission by the nodes 110, 115. For example, the node 102 may combine the portions of the subsequent time interval requested in the schedules generated by the nodes 110, 115 to determine a maximum amount of the subsequent time interval requested for transmission by the nodes 110, 115. The node 102 may then generate another schedule based on the portion of the subsequent time interval requested by the nodes 110, 115 and loading information associated with the node 102, such as queue occupancies or a throughput history. The node 102 provides its schedule to the friendly nodes 104, 105, as indicated by the arrows 145, 150. In a similar manner, the node 101 may generate and provide its own schedule to the friendly node 104, as indicated by the arrow 155. The friendly nodes 104, 105 forward the received schedules to the corresponding nodes 110, 115.

The nodes 110, 115 determine their final transmission schedules for the subsequent time interval based on the scheduling information received from the nodes 101, 102 via the friendly nodes 104, 105. For example, the node 110 may combine the schedules generated by the nodes 101, 102 to generate a final transmission schedule that does not conflict with either the schedule received from the node 101 or the schedule received from the node 102. The node 110 may then transmit signals in the unlicensed frequency band using the scheduled portions of the subsequent time interval. However, the node 110 is not required to transmit signals during the scheduled portions. The nodes 101, 102 may therefore monitor transmissions during these portions to determine if they may be used for additional transmission in the scheduled portions of the subsequent time interval on the channels of the unlicensed frequency band that are reserved for the nodes 110, 115. In a similar manner, the node 115 determines a final transmission schedule (and uses this schedule to determine when to transmit in the unlicensed frequency band) based on the schedule received from the node 102.

Some embodiments of the node 102 transmit signals to other neighboring devices that are not involved in the handshaking protocol to instruct these devices to bypass transmission during time intervals that are used by (or expected to be used by) the nodes 110, 115 that operate according to the second RAT. For example, the node 102 may broadcast a clear-to-send-to-self message that can be received by user equipment 160 or other nodes 103 that are proximate to the node 102, as indicated by the arrows 165, 170. The clear-to-send-to-self message may include information indicating the portions of the subsequent time interval that are reserved for transmission by one or more of the nodes 110, 115. Upon receipt of the clear-to-send-to-self message, the user equipment 160 or the node 103 bypasses transmission during the portions of the subsequent time interval indicated in the clear-to-send-to-self message.

In some embodiments, the handshaking protocol for coexistence is completed prior to the beginning of the subsequent time interval so that the nodes 101-105, 110, 115 are aware of the final transmission schedules before the beginning of the subsequent time interval. For example, if the duration of the subsequent time interval is one second, the handshaking protocol may be initiated approximately one half second prior to the beginning of the subsequent time interval. However, other durations of the subsequent time interval and different offsets between the subsequent time interval and performance of the handshaking protocol may be used in other embodiments. The negotiated schedules may also include idle portions that allow one or more of the nodes 101-105, 110, 115 to perform measurements. The idle portions may also be used to accommodate broadcast signal such as Wi-Fi beacons, control signaling, Wi-Fi Voice-over-IP, or other activity. For example, the schedules may include about 20% idle time. Some embodiments of the nodes 110, 115 that operate according to LAA or MuLTEFire use LBT as a co-existence mechanism for sharing channels of the unlicensed frequency band with Wi-Fi nodes such as the nodes 101-103. Thus, the nodes 110, 115 may not be able to acquire the unlicensed channel for transmission in their scheduled timeslots, e.g., as indicated in the final transmission schedule. Instead, the nodes 110, 115 may be able to acquire the channels in one or more subsequent timeslots. The nodes 101-103 that have access to the published final transmission schedule that indicates potential LAA transmissions by one or more of the nodes 110, 115 may therefore choose to back off in response to detecting transmissions that do not contain a Wi-Fi preamble even if the transmissions are detected at received signal strength that are below the energy detection threshold because the nodes 101-103 may assume that the received signals are from a co-existing LAA node 110, 115. The nodes 110, 115 may also choose to back off in response to detecting transmissions received at a signal strength below the energy detection threshold in time slots that the final transmission schedule indicates are reserved for the nodes 101-103.

Some embodiments of the handshaking protocol may be implemented between nodes that operate according to the same RAT but are owned by different operators. For example, different operators may own nodes that operate according to the LAA but are unable to decode each other's transmissions at received signal strength below the energy detection threshold. These nodes may implement the handshaking protocol to support coexistence of nodes that are owned by the different operators. The handshaking protocol may also be implemented according to predefined rules. For example, schedules generated by the nodes 101-105, 110, 115 may be constrained to request access to or reserve less than 50% of the subsequent time interval covered by the schedule. For another example, schedules generated by the nodes 101-105, 110, 115 may apply to scheduling intervals (or subintervals) that are less than a predetermined number of milliseconds or seconds.

Figure 2:
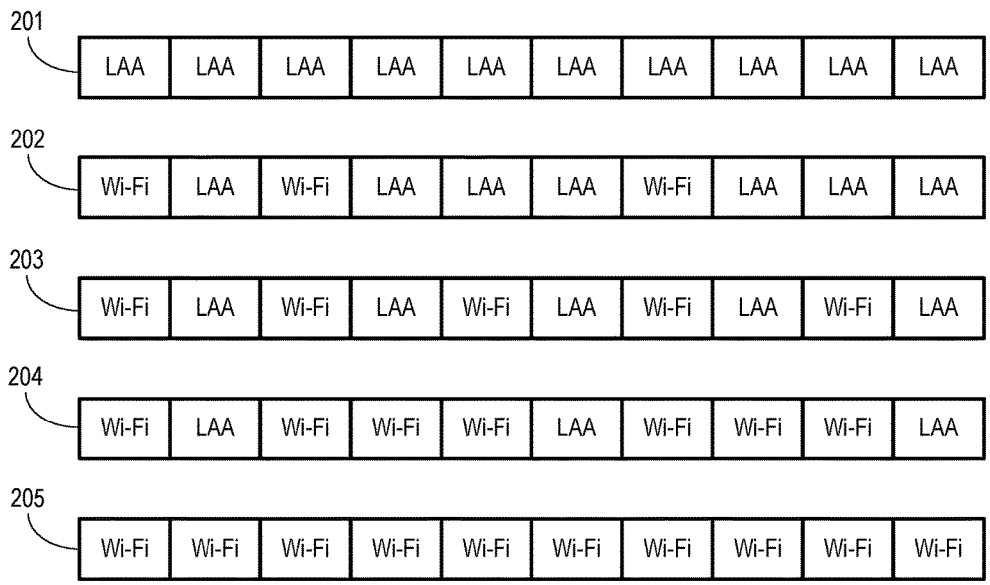
FIG. 2 is a diagram of schedules indicating allocation of subintervals of a subsequent time interval for transmission by nodes that implement different RATs according to some embodiments.

FIG. 2 is a diagram of schedules indicating allocation of subintervals of a subsequent time interval for transmission by nodes that implement different RATs according to some embodiments. The schedules 201, 202, 203, 204, 205 (collectively referred to herein as "the schedules 201-205") may be used by some embodiments of the nodes 101-105, 110, 115 shown in FIG. 1. The schedules 201-205 may be predetermined and associated with schedule identifiers so that the nodes can indicate one of the schedules 201-205 by transmitting the corresponding schedule identifier. The schedules 201-205 may also be indicated by transmitting information indicating durations of the subintervals, starting times of the subintervals, ending times of the subintervals, allocation of the subintervals to nodes that transmit according to the different RATs, or other information. In the illustrated embodiment, the schedules 201-205 indicate subintervals that are reserved for (or requested by) nodes that operate according to LAA standards and nodes that operate according to Wi-Fi standards.

The schedules 201-205 correspond to different percent allocations to the LAA nodes and the Wi-Fi nodes. For example, the schedule 201 indicates a 100% allocation of the subsequent time interval to LAA nodes and all of the subintervals are requested by or reserved for transmission by one or more LAA nodes. The schedule 202 indicates a 70% allocation to LAA nodes and a 30% allocation to Wi-Fi nodes. Thus, seven subintervals are associated with LAA nodes and three subintervals are associated with Wi-Fi nodes. The schedule 203 indicates a 50-50% allocation to LAA nodes and Wi-Fi nodes. The schedule 204 indicates a 30-70% allocation to LAA nodes and Wi-Fi nodes. The schedule 205 indicates 100% allocation to Wi-Fi nodes.

Figure 3:
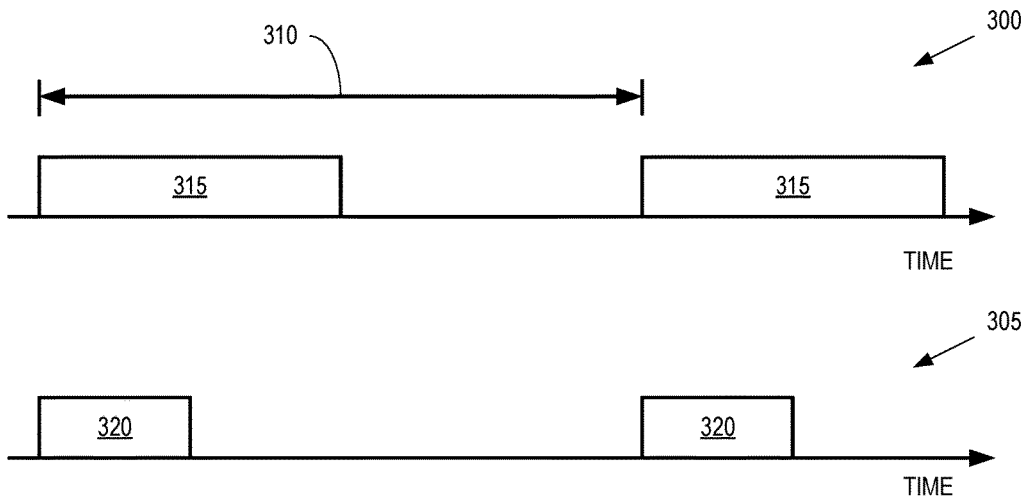
FIG. 3 is a diagram that illustrates different duty cycles for transmissions by a node that operates according to a first RAT according to some embodiments.

FIG. 3 is a diagram that illustrates different duty cycles 300, 305 for transmissions by a node that operates according to a first RAT according to some embodiments. In the diagram, time increases from left to right as indicated by the arrows. The duty cycles are used to indicate portions of a time interval 310 that are requested by (or reserved for) a node to transmit in the unlicensed frequency band according to the first RAT. For example, the duty cycle 300 indicates that a portion 315 that corresponds to 50% of the time interval 310 is requested by (or reserved for) the node to transmit in the unlicensed frequency band according to the first RAT. The remaining 50% of the time interval 310 is available for transmission by other nodes according to other RATs. For another example, the duty cycle 305 indicates that a portion 320 that corresponds to 25% of the time interval 310 is requested by (or reserved for) the node is transmitting the unlicensed frequency band according to the first RAT. The remaining 75% of the time interval 310 is available for transmission by other nodes according to other RATs.

Information indicating the duty cycles 300, 305 may be used to indicate schedules for transmission in subsequent time intervals. For example, a node may transmit an identifier of one of a predetermined set of duty cycles 300, 305 to indicate a request to schedule transmission during a portion of the subsequent time interval that is indicated by the duty cycle. For another example, a node may transmit information indicating a starting time, an ending time, a duration of a portion of the duty cycle, a percentage of the subsequent time interval, and the like to indicate the requested duty cycle for transmission during the subsequent time interval.

Figure 4:
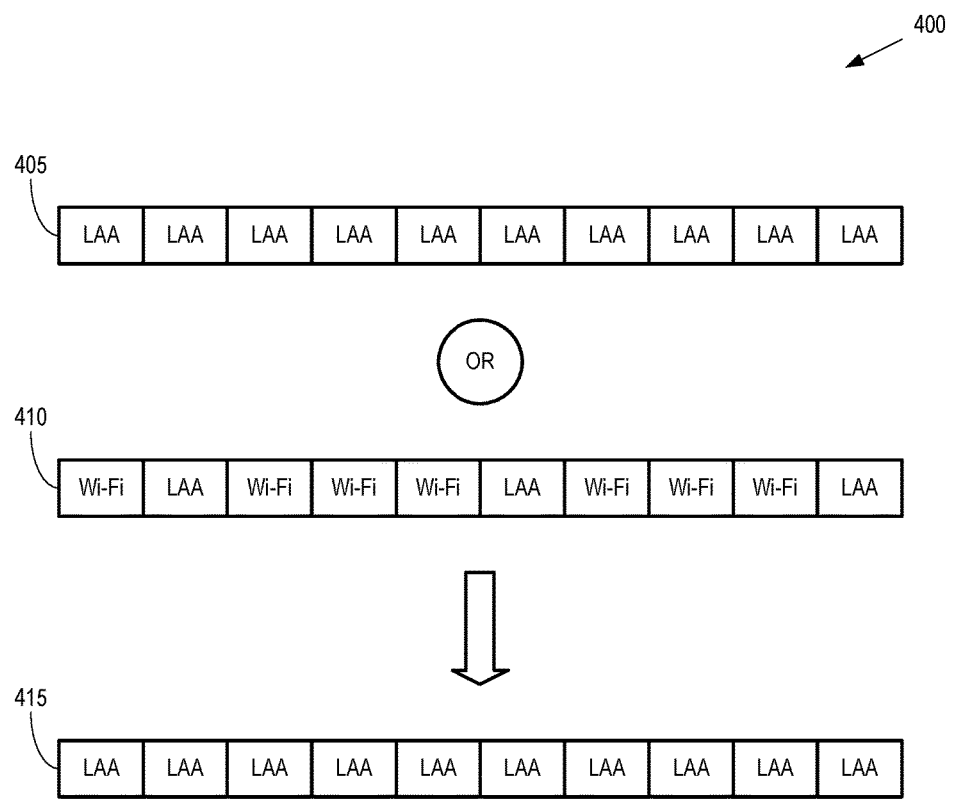
FIG. 4 is a diagram illustrating a set of schedules that are used by a Wi-Fi node to determine a portion of a subsequent time interval requested by a set of nodes for transmission in an unlicensed frequency bands according to some embodiments.

FIG. 4 is a diagram illustrating a set 400 of schedules that are used by a Wi-Fi node to determine a portion of a subsequent time interval requested by a set of LAA nodes for transmission in an unlicensed frequency bands according to some embodiments. The set 400 includes a first schedule 405 that is generated by a first node that operates according to a first RAT such as LAA. For example, the first schedule 405 may be generated by the node 110 shown in FIG. 1 that operates according to LAA. The set 400 also includes a second schedule 410 that is generated by a second node that operates according to the first RAT. For example, the second schedule 410 may be generated by the node 115 shown in FIG. 1 that operates according to LAA. The schedules 405, 410 are provided to a third node that operates according to a second RAT such as Wi-Fi via corresponding friendly nodes that operate according to the second RAT. For example, the schedules 405, 410 may be provided to the node 102 via the friendly nodes 104, 105 associated with the nodes 110, 115 shown in FIG. 1.

The third node combines the first and second schedules 405, 410 to generate a third schedule 415. Some embodiments of the second node generate the third schedule 415 so that the third schedule 415 encompasses all of the subintervals requested by the first node and the second node in the corresponding first and second schedules 405, 410. For example, the third node may implement an OR operation that associates each subinterval in the third schedule with the first RAT if either the first schedule 405 or the second schedule 410 requests the subinterval for transmission during the subsequent time interval. In the illustrated embodiment, the first schedule 405 requests access during 100% of the subsequent time interval and the second schedule 405 request access during 30% of the subsequent time interval. The second node therefore generates a third schedule 415 that indicates that the first and second nodes have requested access to 100% of the subsequent time interval. The second node may then combine the third schedule 415 with additional scheduling information determined by the second node based on loading information to create a final schedule that is broadcast to nodes including the first node, as discussed herein.

Figure 5:
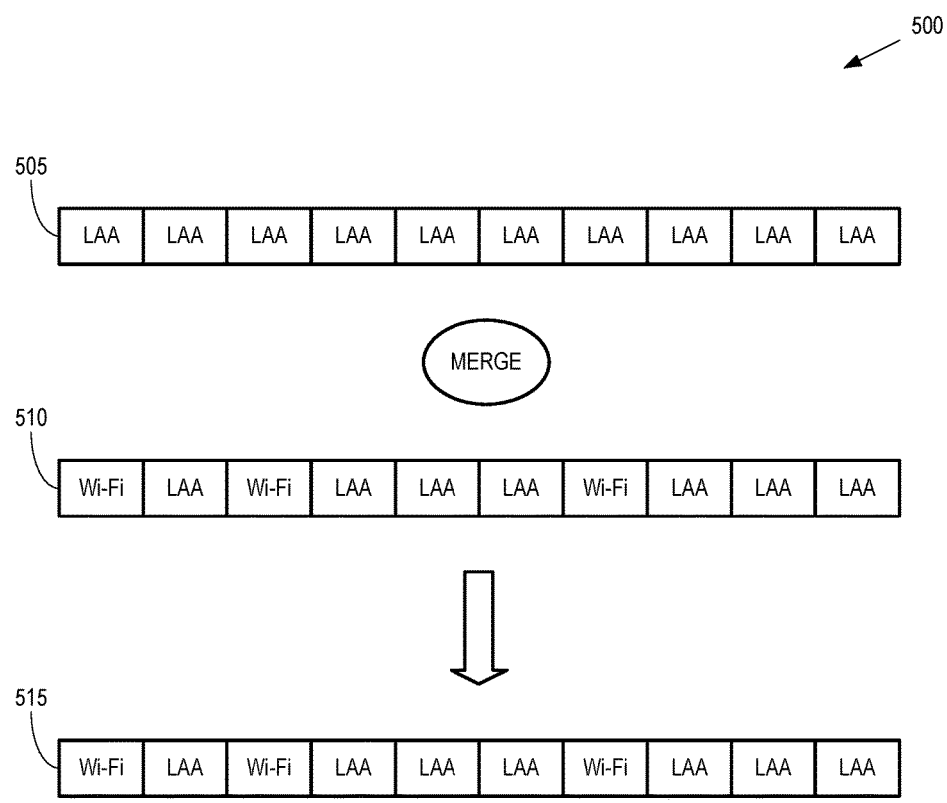
FIG. 5 is a diagram illustrating a set of schedules that a Wi-Fi node uses to determine a final schedule for provision to one or more LAA nodes according to some embodiments.

FIG. 5 is a diagram illustrating a set 500 of schedules that a Wi-Fi node uses to determine a final schedule for provision to one or more LAA nodes according to some embodiments. The set 500 includes a first schedule 505 that is generated by the first node based on schedules provided by one or more of the second nodes. For example, the first schedule 505 may be generated by the node 102 based on proposed schedules provided by the nodes 110, 115 via the corresponding friendly nodes 104, 105 shown in FIG. 1. The set 500 also includes a second schedule 510 that is generated by the second node based on loading information for the second node. For example, the second node may use loading information such as a queue occupancy or a throughput history for the second node to determine that the second node requires 30% of the subsequent time interval to transmit its queued information. Three of the subintervals of the second schedule 510 are therefore reserved for transmission by the second node and the remaining seven subintervals of the second schedule 510 are free for transmission by other nodes.

The second node merges the first schedule 505 and the second schedule 510 to determine a final schedule 515 for broadcast by the second node. In order to maintain fairness, the second node can reserve at least 50% of the subsequent time interval, regardless of the portion of the subsequent time interval that has been requested by nodes that operate according to other RATs. The combined schedules published by the first nodes requested 100% of the subsequent time interval, as indicated by the first schedule 505. The second node has determined that only 30% of the subsequent time interval is needed for the second node to transmit its information. The second node therefore merges the first and second schedules 505, 510 to generate the final schedule 515 that reserves 30% of the subsequent time interval for transmission by the second node. The second node may then broadcast the final schedule 515, which may be received by other nodes such as the friendly nodes 104, 105 and then provided to the corresponding nodes 110, 115 shown in FIG. 1.

Figure 6:
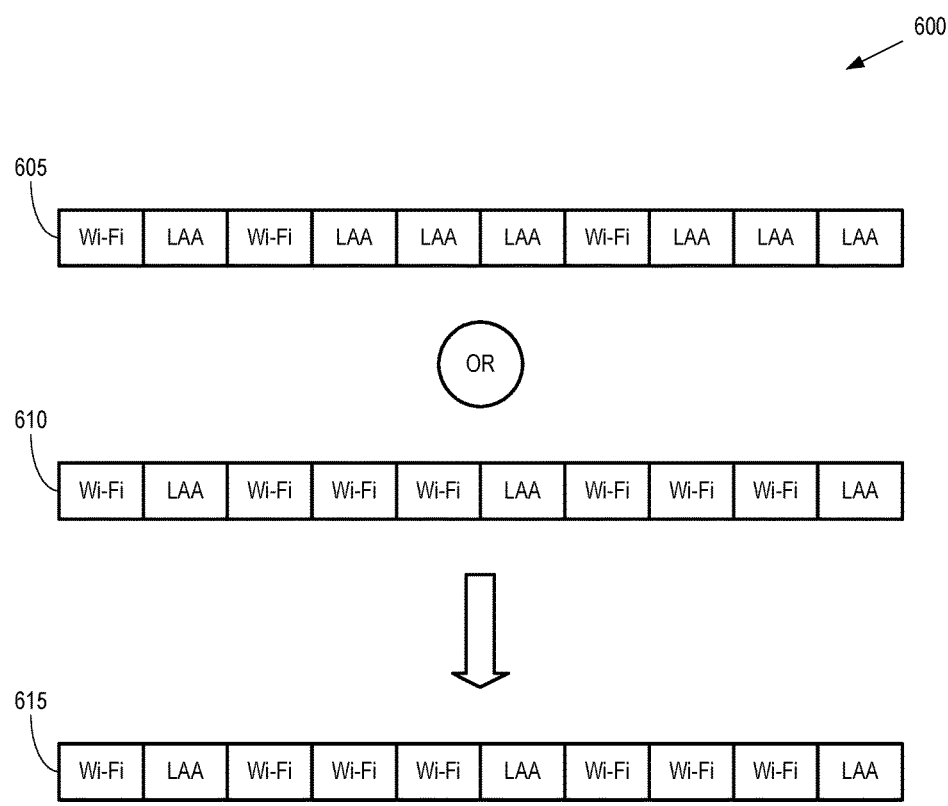
FIG. 6 is a diagram of a set of schedules used by an LAA node to determine a scheduled for transmission by the LAA node in a subsequent time interval according to some embodiments.

FIG. 6 is a diagram of a set 600 of schedules used by an LAA node to determine a schedule for transmission by the LAA node in a subsequent time interval according to some embodiments. The set 600 includes a first schedule 605 that is generated by a first node that operates according to a first RAT such as Wi-Fi. For example, the first schedule 605 may be generated by the first node using a set of schedules such as the set 500 shown in FIG. 5. The set 600 also includes a second schedule 610 that is generated by a second node that operates according to the first RAT. The first schedule 605 and the second schedule 610 are received by a second node that operates according to a second RAT such as LAA. For example, the first schedule 605 and the second schedule 610 may be received from the nodes 101, 102 at the node 110 via the friendly node 104 shown in FIG. 1.

The second node combines the first schedule 605 and the second schedule 610 to determine a transmission schedule 615 for the second node in the subsequent time interval. Some embodiments of the second node may prioritize transmissions according to the first RAT so that the transmission schedule 615 only allocates subintervals for transmission by the second node according to the second RAT if the subintervals have not been reserved in either the first schedule 605 or the second schedule 610. For example, if the first schedule 605 and the second schedule 610 indicate subintervals that are reserved for Wi-Fi transmissions by a binary value of 1 or a Boolean value of TRUE and subintervals that are free for LAA transmissions by a binary value of 0 or a Boolean value of FALSE, an OR may be performed between the first schedule 605 and the second schedule 610 to generate the transmission schedule 615 so that a slot is reserved for Wi-Fi if either the first schedule 605 or the second schedule 610 indicates that the slot is reserved for the corresponding Wi-Fi node. For example, the fourth time slot in the first schedule 605 requests the time slot for LAA transmissions (binary value of 0 or Boolean value of FALSE) and the fourth time slot in the second schedule 610 request the time slot for Wi-Fi transmissions (binary value of 1 or Boolean value of TRUE). The OR operation applied to the fourth time slot generates a result that indicates the slot is reserved for Wi-Fi transmission (e.g., 0 OR 1=1, FALSE OR TRUE=TRUE). However, some embodiments may use other rules, algorithms, or logical operations to combine the first schedule 605 and the second schedule 610.

Figure 7:
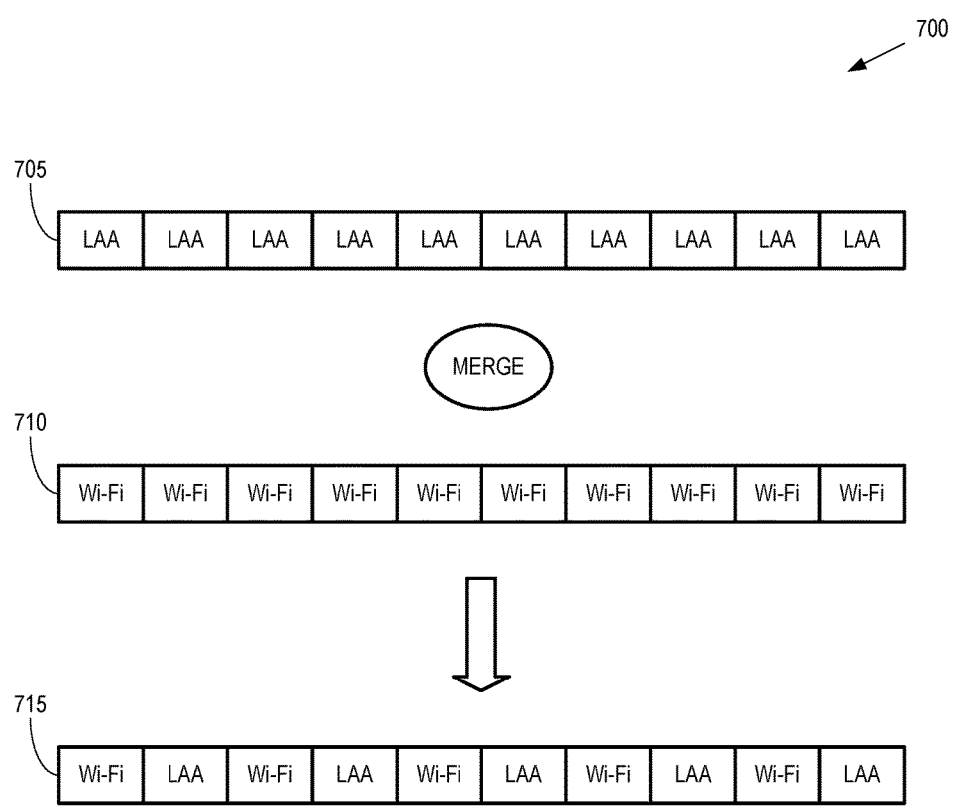
FIG. 7 is a diagram of a set of schedules to illustrate a fair allocation of subintervals of a subsequent time interval to nodes that operate according to different RATs according to some embodiments.

FIG. 7 is a diagram of a set 700 of schedules to illustrate a fair allocation of subintervals of a subsequent time interval to nodes that operate according to different RATs according to some embodiments. The set 700 may be used by a first node that operates according to a first RAT such as Wi-Fi, e.g., the set 700 may be used by the node 102 shown in FIG. 1. The set 700 includes a first schedule 705 that is generated by the first node based on schedules provided by one or more second nodes that operate according to a second RAT such as LAA. For example, the first schedule 705 may be generated by the node 102 based on proposed schedules provided by the nodes 110, 115 via the corresponding friendly nodes 104, 105 shown in FIG. 1. The set 700 also includes a second schedule 710 that is generated by the second node based on loading information for the second node.

The first schedule 705 requests 100% of the subsequent time interval for transmission by LAA nodes and the second schedule 710 requests 100% of the subsequent time interval for transmission by the Wi-Fi nodes. The second node merges the first schedule 705 and the second schedule 710 based on a fairness requirement that the Wi-Fi nodes should receive at least 50% of the subsequent time interval if requested by the Wi-Fi nodes. The second node therefore merges the first and second schedules 705, 710 to generate the final schedule 715 that reserves 50% of the subsequent time interval for transmission by the first nodes and 50% of the subsequent time interval for transmission by the second node. The second node may then broadcast the final schedule 715, which may be received by other nodes such as the friendly nodes 104, 105 and then provided to the corresponding nodes 110, 115 shown in FIG. 1.

Figure 8:
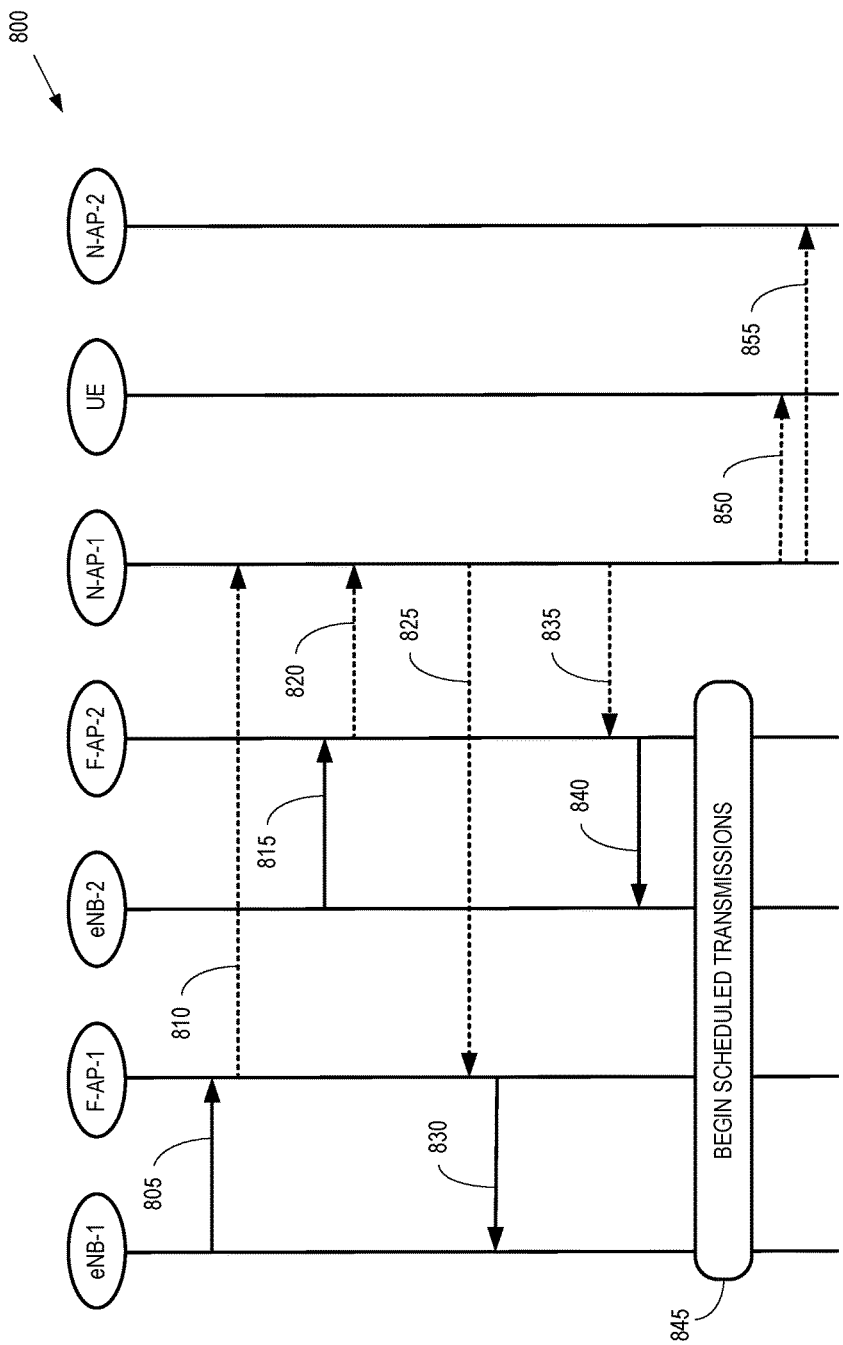
FIG. 8 is a diagram indicating signal flows used in a handshaking protocol for coexistence of nodes that operate according to different RATs in an unlicensed frequency band according to some embodiments.

FIG. 8 is a diagram indicating signal flows used in a handshaking protocol 800 for coexistence of nodes that operate according to different RATs in an unlicensed frequency band according to some embodiments. In the illustrated embodiment, a first node (eNB-1) that operates according to a first RAT such as LAA has an interface with a first friendly node (F-AP-1) that operates according to a second RAT such as Wi-Fi. A second node (eNB-2) that operates according to the first RAT has an interface with a second friendly node (F-AP-2) that operates according to the second RAT. The first and second nodes are proximate a first neighbor node (N-AP-1) that operates according to the second RAT. The first neighbor node is proximate a second neighbor node (N-AP-2) and one or more user equipment (UE). The handshaking protocol 800 may therefore be implemented in some embodiments of the wireless communication system 100 shown in FIG. 1. Signals transmitted over wired connections are indicated by solid lines and signals transmitted wirelessly are indicated by dotted lines.

The first node transmits signals 805 indicating a schedule generated by the first node. The signals 805 are transmitted over the interface between the first node and the first friendly node, which broadcasts signals 810 indicating the schedule over an air interface. The signals 810 are received by the first neighbor node. The second node transmits signals 815 indicating a schedule generated by the second node. The signals 815 are transmitted over the interface between the second node and the second friendly node, which broadcasts signals 820 indicating the schedule over the air interface. The signals 820 are also received by the first neighbor node, which uses the schedules indicated in the signals 810, 820 to generate a final schedule for transmission in the subsequent time interval.

The first neighbor node transmits signals 825 that indicate the final schedule over the air interface to the first friendly node, which forwards signals 830 indicating the final schedule to the first node. The first neighbor node also transmit signals 835 that indicate the final schedule over the air interface to the second friendly node, which forwards signals 840 indicating the final schedule to the second node. In some embodiments, the signals 825, 835 may be transmitted as a single broadcast signal that is received by both the first and second friendly nodes. As discussed herein, the first and second nodes use the received final schedules to determine corresponding transmission schedules for the subsequent time interval. The first and second nodes begin transmission according to their respective transmission schedules at 845. Some embodiments of the first neighbor node also transmit clear-to-send-to-self messages 850, 855 to the second neighbor node and the user equipment. The clear-to-send-to-self messages 850, 855 may be transmitted as a single broadcast message that is received by both the second neighbor node and the user equipment.

Figure 9:
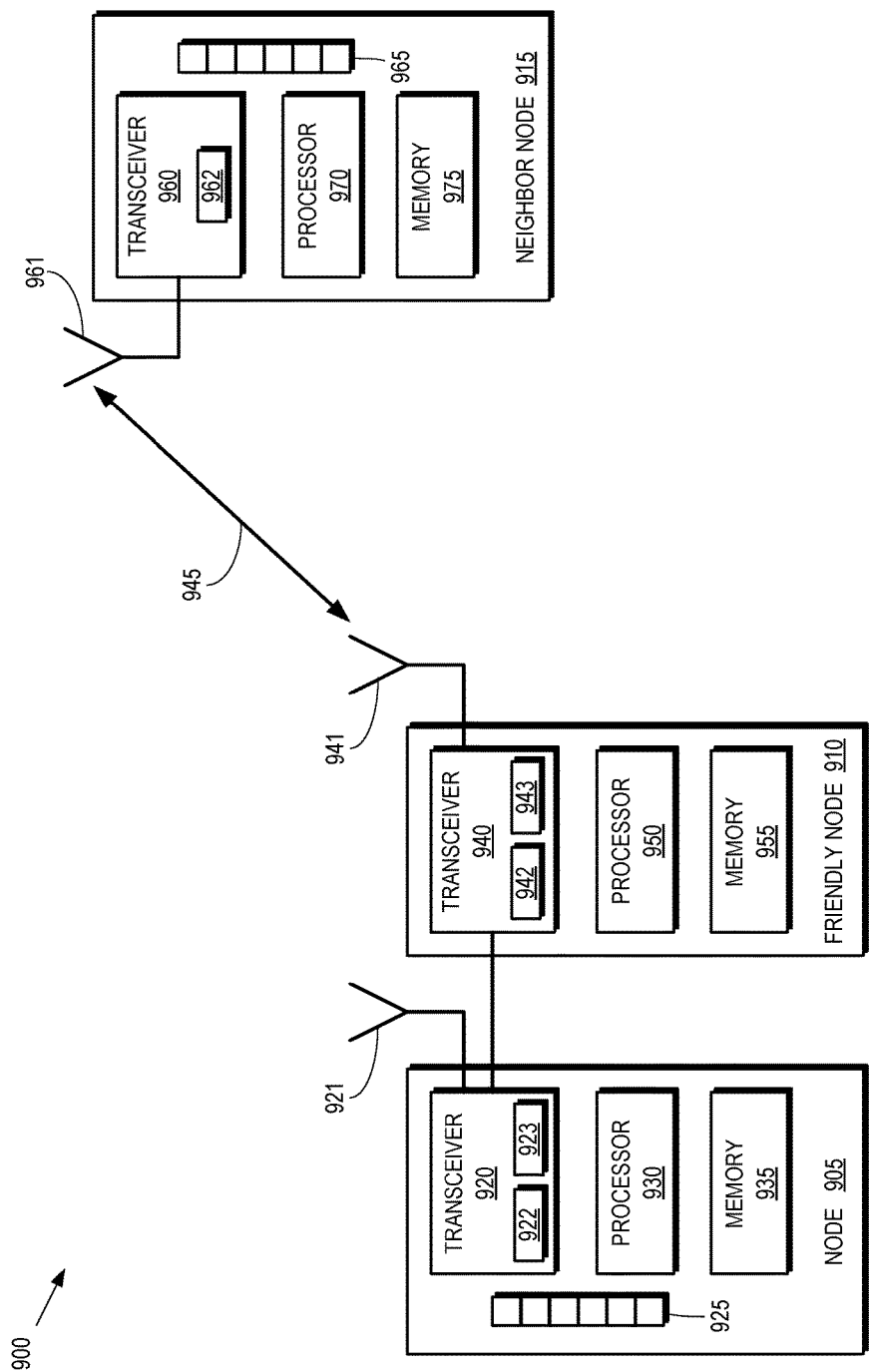
FIG. 9 is a block diagram of a wireless communication system that supports coexistence of nodes that operate according to different RATs in unlicensed frequency bands according to some embodiments.

FIG. 9 is a block diagram of a wireless communication system 900 that supports coexistence of nodes that operate according to different RATs on a channel or channels of unlicensed frequency bands according to some embodiments. The communication system 900 implements a node 905 that operates according to a first RAT such as LAA, a friendly node 910 that operates according to a second RAT such as Wi-Fi, and a neighbor node 915 that operates according to the second RAT. The communication system 900 may therefore be used to implement some embodiments of the wireless communication system 100 shown in FIG. 1.

The node 905 includes a transceiver 920 for transmitting and receiving signals. Some embodiments of the transceiver 920 support multiple interfaces such as a first interface towards an LTE antenna 921 and a second interface towards the friendly node 910. The first or second interfaces may be a direct link or an indirect link via one or more intermediate entities. To support the first interface, the transceiver 920 includes an LTE module 922 that supports an LTE baseband function, LTE access stratum functions, LTE protocols, and the like. To support the second interface, the transceiver 920 includes a WLAN module 923 that supports IP packet routing and the like. The transceiver 920 may be implemented as a single integrated circuit (e.g., using a single ASIC or FPGA) or as a system-on-a-chip (SOC) that includes different modules for implementing the functionality of the transceiver 920. The transceiver 920 may be used to transmit information stored in a queue 925.

The node 905 also includes a processor 930 and a memory 935. The processor 930 may be used to execute instructions stored in the memory 935 and to store information in the memory 935 such as the results of the executed instructions. The processor 930 may also store information in the queue 925 for transmission by the transceiver 920, as well as determine parameters of the queue 925 such as a queue occupancy. The transceiver 920, the processor 930, and the memory 935 may therefore be configured to implement some embodiments of the handshaking protocol 800 shown in FIG. 8.

The friendly node 910 includes a transceiver 940 for transmitting and receiving signals. Some embodiments of the transceiver 940 support multiple interfaces such as a first interface towards an Wi-Fi antenna 941 and a second interface towards the node 905. The first or second interfaces may be a direct link or an indirect link via one or more intermediate entities. To support the first interface, the transceiver 940 includes a Wi-Fi module 942 that supports Wi-Fi communication in the unlicensed frequency band according to the Wi-Fi standards over an air interface 945. To support the second interface, the transceiver 940 includes a WLAN module 943 that supports IP packet routing. The transceiver 940 may be implemented as a single integrated circuit (e.g., using a single ASIC or FPGA) or as a system-on-a-chip (SOC) that includes different modules for implementing the functionality of the transceiver 940.

The friendly node 910 also includes a processor 950 and a memory 955. The processor 950 may be used to execute instructions stored in the memory 955 and to store information in the memory 955 such as the results of the executed instructions. Some embodiments of the processor 950 are configured to convert scheduling information received from the node 905 from a format used to transmit the information over the interface between the node 905 and the friendly node 910 to another format (such as a Wi-Fi format) that is used to transmit the information over the air interface 945. Some embodiments of the processor 950 may also be configured to convert scheduling information received from the neighbor node 915 over the air interface 945 into another format (such as an IP packet) for transmission to the node 905. The transceiver 940, the processor 950, and the memory 955 may therefore be configured to implement some embodiments of the handshaking protocol 800 shown in FIG. 8.

The neighbor node 915 includes a transceiver 960 for transmitting and receiving signals. Some embodiments of the transceiver 960 support an interface such as a first interface towards an Wi-Fi antenna 961, as well as other interfaces that are not shown in FIG. 9. The first interface may be a direct link or an indirect link via one or more intermediate entities. To support the first interface, the transceiver 960 includes a Wi-Fi module 962 that supports Wi-Fi communication in the unlicensed frequency band according to the Wi-Fi standards over the air interface 945. The transceiver 960 may be configured to transmit information stored in a queue 965. The transceiver 960 may be implemented as a single integrated circuit (e.g., using a single ASIC or FPGA) or as a system-on-a-chip (SOC) that includes different modules for implementing the functionality of the transceiver 960. The neighbor node 915 also includes a processor 970 and a memory 975. The processor 970 may be used to execute instructions stored in the memory 975 and to store information in the memory 975 such as the results of the executed instructions. The processor 970 may also store information in the queue 965 for transmission by the transceiver 960, as well as determine parameters of the queue 965 such as a queue occupancy. The transceiver 960, the processor 970, and the memory 975 may therefore be configured to implement some embodiments of the handshaking protocol 800 shown in FIG. 8.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
providing, from a first node that operates according to a first radio access technology (RAT) to a second node that operates according to a second RAT, a first schedule requesting a first portion of a subsequent time interval for transmission in an unlicensed frequency band;
receiving, at the first node from the second node, at least one second schedule requesting at least one second portion of the subsequent time interval for transmission in the unlicensed frequency band by at least one third node that operates according to the second RAT; and
transmitting, from the first node, signals in the unlicensed frequency bands during a third portion of the subsequent time interval that is determined based on the at least one second portion.

2. The method of claim 1, further comprising:
generating, at the first node, the first schedule based on at least one of a queue occupancy at the first node and a throughput history associated with the first node.

3. The method of claim 2, wherein generating the first schedule comprises generating information indicating a duty cycle for transmission during the subsequent time interval.

4. The method of claim 2, wherein generating the first schedule comprises generating information indicating one of a plurality of predetermined allocations of portions of the subsequent time interval.

5. The method of claim 1, wherein receiving the at least one second schedule comprises receiving a plurality of second schedules requesting a plurality of second portions of the subsequent time interval for transmission in the unlicensed frequency band by a plurality of third nodes that operate according to the second RAT.

6. The method of claim 5, further comprising:
combining the plurality of second schedules to determine the third portion of the subsequent time interval.

7. The method of claim 6, wherein combining the plurality of second schedules comprises combining the plurality of second schedules so that the third portion does not overlap with the plurality of second portions.

8. A method comprising:
receiving, at a first node that operates according to a first radio access technology (RAT) from a second node that operates according to the first RAT, at least one first schedule requesting at least one first portion of a subsequent time interval for transmission in an unlicensed frequency band by at least one third node according to a second RAT;
transmitting, from the first node, a second schedule indicating a second portion of the subsequent time interval, the second schedule being determined based on the at least one first schedule; and
transmitting, from the first node, signals in the unlicensed frequency band during the second portion of the subsequent time interval.

9. The method of claim 8, further comprising:
generating, at the first node, the second schedule based on at least one of a queue occupancy at the first node and a throughput history associated with the first node.

10. The method of claim 9, wherein generating the first schedule comprises generating information indicating a duty cycle for transmission during the subsequent time interval.

11. The method of claim 9, wherein generating the first schedule comprises generating information indicating one of a plurality of predetermined allocations of portions of the subsequent time interval.

12. The method of claim 9, wherein receiving the at least one first schedule comprises receiving a plurality of first schedules requesting a plurality of first portions of the subsequent time interval for transmission in the unlicensed frequency band by a plurality of third nodes that operate according to the second RAT.

13. The method of claim 12, further comprising:
combining the plurality of first schedules to determine a third schedule that indicates a third portion of the subsequent time interval that encompasses the plurality of first portions indicated by the plurality of first schedules.

14. The method of claim 13, further comprising:
generating a fourth schedule based on the at least one of the queue occupancy at the first node and the throughput history associated with the first node.

15. The method of claim 14, wherein generating the second schedule comprises combining the third schedule and the fourth schedule.

16. The method of claim 8, further comprising:
transmitting, from the first node, a clear-to-send-to-self message in the unlicensed frequency band during the second portion of the subsequent time interval.

17. A first node that operates according to a first radio access technology (RAT), the first node comprising:
a processor to generate a first schedule requesting a first portion of a subsequent time interval for transmission in an unlicensed frequency band; and
a transceiver to provide the first schedule to a second node that operates according to a second RAT, receive at least one second schedule from the second node requesting at least one second portion of the subsequent time interval for transmission in the unlicensed frequency band by at least one third node that operates according to the second RAT, and transmit signals in the unlicensed frequency bands during a third portion of the subsequent time interval that is determined based on the at least one second portion.

18. The first node of claim 17, wherein the processor is to generate the first schedule based on at least one of a queue occupancy at the first node and a throughput history associated with the first node.

19. The first node of claim 18, wherein the processor is to generate information indicating a duty cycle for transmission during the subsequent time interval.

20. The first node of claim 18, wherein the processor is to generate information indicating one of a plurality of predetermined allocations of portions of the subsequent time interval.

21. The first node of claim 17, wherein the transceiver is to receive a plurality of second schedules requesting a plurality of second portions of the subsequent time interval for transmission in the unlicensed frequency band by a plurality of third nodes that operate according to the second RAT.

22. The first node of claim 21, wherein the processor is to combine the plurality of second schedules to determine the third portion of the subsequent time interval.

23. The first node of claim 22, wherein the processor is to combine the plurality of second schedules so that the third portion does not overlap with the plurality of second portions.

24. A first node that operates according to a first radio access technology (RAT), the first node comprising:
   a transceiver to receive, from a second node that operates according to the first RAT, at least one first schedule requesting at least one first portion of a subsequent time interval for transmission in an unlicensed frequency band by at least one third node according to a second RAT; and
   a processor to generate a second schedule indicating a second portion of the subsequent time interval, the second schedule being determined based on the at least one first schedule, wherein the transceiver is to transmit the second schedule, and wherein the transceiver is to transmit signals in the unlicensed frequency band during the second portion of the subsequent time interval.

25. The first node of claim 24, wherein the processor is to generate the second schedule based on at least one of a queue occupancy at the first node and a throughput history associated with the first node.

26. The first node of claim 25, wherein the processor is to generate information indicating a duty cycle for transmission during the subsequent time interval.

27. The first node of claim 26, wherein the processor is to generate information indicating one of a plurality of predetermined allocations of portions of the subsequent time interval.

28. The first node of claim 24, wherein the transceiver is to receive a plurality of first schedules requesting a plurality of first portions of the subsequent time interval for transmission in the unlicensed frequency band by a plurality of third nodes that operate according to the second RAT.

29. The first node of claim 28, wherein the processor is to generate the plurality of first schedules to determine a third schedule that indicates a third portion of the subsequent time interval that encompasses the plurality of first portions indicated by the plurality of first schedules.

30. The first node of claim 29, wherein the processor is to generate a fourth schedule based on the at least one of a queue occupancy at the first node and a throughput history associated with the first node.

31. The first node of claim 30, wherein the processor is to combine the third schedule and the fourth schedule to generate the second schedule.

32. The first node of claim 24, wherein the transceiver is to transmit a clear-to-send-to-self message in the unlicensed frequency band during the second portion of the subsequent time interval.

* * * * *